United States Patent
Nguyen et al.

(10) Patent No.: US 12,225,001 B2
(45) Date of Patent: Feb. 11, 2025

(54) AUTONOMOUS CONTROL AND SECURE COMMUNICATIONS SYSTEM AND METHODS FOR SENSORS

(71) Applicant: DRKUMO INC., Buena Park, CA (US)

(72) Inventors: Kelly Dao Xuan Nguyen, Cerritos, CA (US); Duc Ngoc Pham, Cupertino, CA (US); Tri Ngoc Truong, Ho Chi Minh (VN); Vu Tuan Phan, Ho Chi Minh (VN); Ha Thi Thu Bui, Ho Chi Minh (VN); Anvay Arvind Rane, Santa Clara, CA (US); Bao Huynh Duong, Di An (VN)

(73) Assignee: DRKUMO INC., Buena Park, CA (US)

( * ) Notice: Subject to any disclaimer, the term of this patent is extended or adjusted under 35 U.S.C. 154(b) by 0 days.

(21) Appl. No.: 17/346,299

(22) Filed: Jun. 14, 2021

(65) Prior Publication Data

US 2023/0328054 A1      Oct. 12, 2023

(51) Int. Cl.
 *H04L 9/40* (2022.01)
(52) U.S. Cl.
 CPC ........ *H04L 63/083* (2013.01); *H04L 63/0435* (2013.01); *H04L 63/0876* (2013.01)
(58) Field of Classification Search
 CPC ............... H04L 63/083; H04L 63/0435; H04L 63/0876
 See application file for complete search history.

(56) References Cited

U.S. PATENT DOCUMENTS

| | | | |
|---|---|---|---|
| 6,629,145 B1 * | 9/2003 | Pham | H04L 61/5014 709/228 |
| 9,838,390 B2 * | 12/2017 | Zakaria | H04W 4/70 |
| 2017/0171196 A1 * | 6/2017 | Britt | H04L 63/0876 |
| 2017/0171747 A1 * | 6/2017 | Britt | H04W 12/0431 |
| 2017/0339120 A1 * | 11/2017 | Zakaria | H04L 9/0861 |
| 2017/0347264 A1 * | 11/2017 | Holland | H04L 9/3242 |
| 2017/0359343 A1 * | 12/2017 | Sterl | H04L 63/0876 |
| 2018/0317266 A1 * | 11/2018 | Britt | H04W 4/80 |
| 2019/0013945 A1 * | 1/2019 | Hamlin | G06F 11/0709 |
| 2019/0258986 A1 * | 8/2019 | Nguyen | G06Q 20/401 |

OTHER PUBLICATIONS

NPL Search History (Year: 2023).*
NPL Search History (Year: 2024).*

* cited by examiner

*Primary Examiner* — Samson B Lemma
*Assistant Examiner* — Richard W Cruz-Franqui (57) ABSTRACT

A networked computer system providing an automated control system that enables a sensor client to securely communicate with a heterogeneous set of unique sensors. The system enables autonomous secure identification of specific sensors capable of system inter-operation. Recognized sensors are autonomously paired and the connection secured using a password unique to the sensor and autonomously managed by the system. Measurement data is source encrypted using a well-defined public key, thereby providing data security that extends uninterrupted from the sensor itself to an appropriately authorized subsystem of the control system.

19 Claims, 7 Drawing Sheets

FIG. 5
DEVICE ID

FIG. 6

FIG. 7
ADVERTISEMENT PACKET

AUTONOMOUS CONTROL AND SECURE COMMUNICATIONS SYSTEM AND METHODS FOR SENSORS

BACKGROUND OF THE INVENTION

Field of the Invention

The present invention is generally related to secure communications between sensors and other computer systems and, in particular, to a system and methods for autonomously managing the unique connection of and secure communications between a sensor management system and a sensor.

Description of the Related Art

The Internet of Things (IoT) broadly describes an architectural framework for collecting information from some set of sensors and relaying that information through a communications network to a controller system. Of particular significance, the sensors may range from complex and multifunctional to exceedingly simple, distributed in the closed confines of a specific structure or throughout a wide geographical region, and scale from a few to massive numbers.

IoT system implementations have been broadly proposed for use in a wide variety of fields. Health care, including remote patient monitoring (RPM), is one such field. IoT systems have been generally proposed for use in collecting patient and other data, aggregating the data using analytics, and providing various reports on the data. A wide and growing number of wearable sensor devices exist to measure personal health and medical information ranging from simple step counts and heart-beat rates to comparatively complex electrocardiogram (ECG) signals.

Conventionally, each wearable sensor communicates using a wireless communications technology, such as Bluetooth®, with a sensor-specific application executed on a smart-device, such as IPhone® smart phones, IPad® tablets, and similar computing devices. This sensor application may then utilize Internet-connected cloud services for data aggregation and related social services. For example, Fitbit® wearable activity trackers communicate with an exclusively proprietary application that, in turn, accesses cloud-based persistent storage to host an alternative data presentation interface and to provide social motivational resources.

Actual IoT system implementations must address many complex, characteristically field-of-use specific, implementation issues. Two overarching issues relate to security and manageability. Securing the data produced by a large if not massive number of geographically distributed users and sensors is essential. Current known security approaches rely simply on link-layer encryption to protect the sensor measurement data as transferred between sensor devices, data relay nodes, and back-end server systems. Use of link-layer encryption alone presents a number of known security vulnerabilities. One such natural vulnerability is that link-layer encryption provides little or no security protections for data being transferred between different data-link protocol stacks as established within a data relay node.

To provide additional security, U.S. Pat. No. 10,375,044 uses public key infrastructure (PKI) techniques to encrypt the sensor measurement data. Each participating smart-device is required to host a secure key store containing a device unique public/private key pair. Each smart-device must also implement the procedures necessary to execute secure public key exchange and to securely retain and manage the exchanged keys. To the extent that the sensors are not themselves smart-device hosting secure key stores, the sensor data transmitted by the sensors is protected by at most link-layer encryption.

The distributed key stores themselves, however, create a separate, rather substantial security vulnerability. To provide effective security, the key stores are required to be implemented in every participating device. This requires placing secure key stores in every sensor, no matter how small, remotely distributed, or low-cost. Compromise of a single key store, however, can potentially allow infiltration of the entire connected network. Consequently, the security exposure represented by the distributed key stores will generally outweigh whatever security benefits are achieved through the use of the public key encryption made possible by the distributed key stores.

Manageability issues vary greatly depending on the specifics of the IoT system field-of-use and typically depend on the number, type and relative geographic distribution of the sensors. They may be one time in nature or present ongoing challenges. For example, a smart-home, involving a relatively small number of sensors, installed in fixed locations and selected from a constrained set of host manufacturer defined supported devices, may incur a management overhead burden only with installation of each sensor. In other applications, such as encountered with remote patient monitoring, the sensors are portable, potentially subject to sharing, variable in number, and of heterogeneous types, including source manufactures. For these applications, the management overhead burden is recurring and borne by end-users. Such a burden is undesirable, even if small and requiring minimal technical capabilities. Any such burden is particularly undesirable where the end-user is a patient.

Consequently, a need exists for effective mechanisms for improving the security and manageability of sensor devices in IoT applications.

SUMMARY OF THE INVENTION

Thus, a general purpose of the present invention is to provide a secure, autonomously operable system of communications between a distributed set of individually identifiable sensor devices and a remote sensor management system.

This is achieved in the present invention by providing an automated control system that enables a sensor client to securely communicate with a heterogeneous set of unique sensors. The system enables autonomous secure identification of specific sensors capable of system inter-operation. Recognized sensors are autonomously paired and the connection secured using a password unique to the sensor and autonomously managed by the system. Measurement data is source encrypted using a well-defined public key, thereby providing data security that extends uninterrupted from the sensor itself to an appropriately authorized subsystem of the control system.

An advantage of the present invention is that it operates autonomously to explicitly identify participant sensor devices within range of a participating sensor client. The identification obtained is both universally unique and secure.

Another advantage of the present invention is that it operates autonomously to lock a participant sensor device into a persistent secure, exclusive communications relationship with a remote sensor management system upon user identification of an available participant sensor device. The locked relationship prevents any unauthorized sensor client from interacting with or otherwise meaningfully observing the data produced by the relationship locked participant sensor device.

A further advantage of the present invention is that it autonomously establishes a secure communications connection with each relationship locked participant sensor device whenever the sensor device is powered-on, in-range of a suitable sensor client, and, nominally, not already in communication with another suitable sensor client.

Still another advantage of the present invention is that it provides a uninterrupted secure sensor data communications context that extends between the sensor device and a remote sensor management system. The context bridges over the sensor client, thereby avoiding any need to provide the sensor client with any context encryption keys. Additional application layer encryption protections are implemented by the sensor client to separately secure communications between the sensor client and each communicating participant sensor device and between the sensor client and the remote sensor management system.

Yet another advantage of the present invention is that the exclusive communications relationship established with a participant sensor device is not limited to a single sensor client. While, nominally, a participant sensor device can support an active communications connection with only a single sensor client at one time, the remote sensor management system maintains the security information necessary for any suitable sensor client to facilitate establishing an active instance of the exclusive communications relationship. Thus, the present invention enables the shared use of locked participant sensor devices by multiple sensor clients subject to authorization by the remote sensor management system.

BRIEF DESCRIPTION OF THE DRAWINGS

The present invention may be better understood by reference to the following description of the preferred embodiments and the accompanying drawings, wherein like reference numerals indicate the same or functionally similar elements.

DETAILED DESCRIPTION OF THE INVENTION

The following description presents the present invention in the context of an IoT-based remote patent monitoring system utilizing wireless sensors. While the RPM context and the use of wireless sensors represents the generally preferred application of the present invention, the present invention is broadly applicable to IoT systems where secure communications with the distributed sensor devices, both wireless and wired, is desired.

Figure 1:
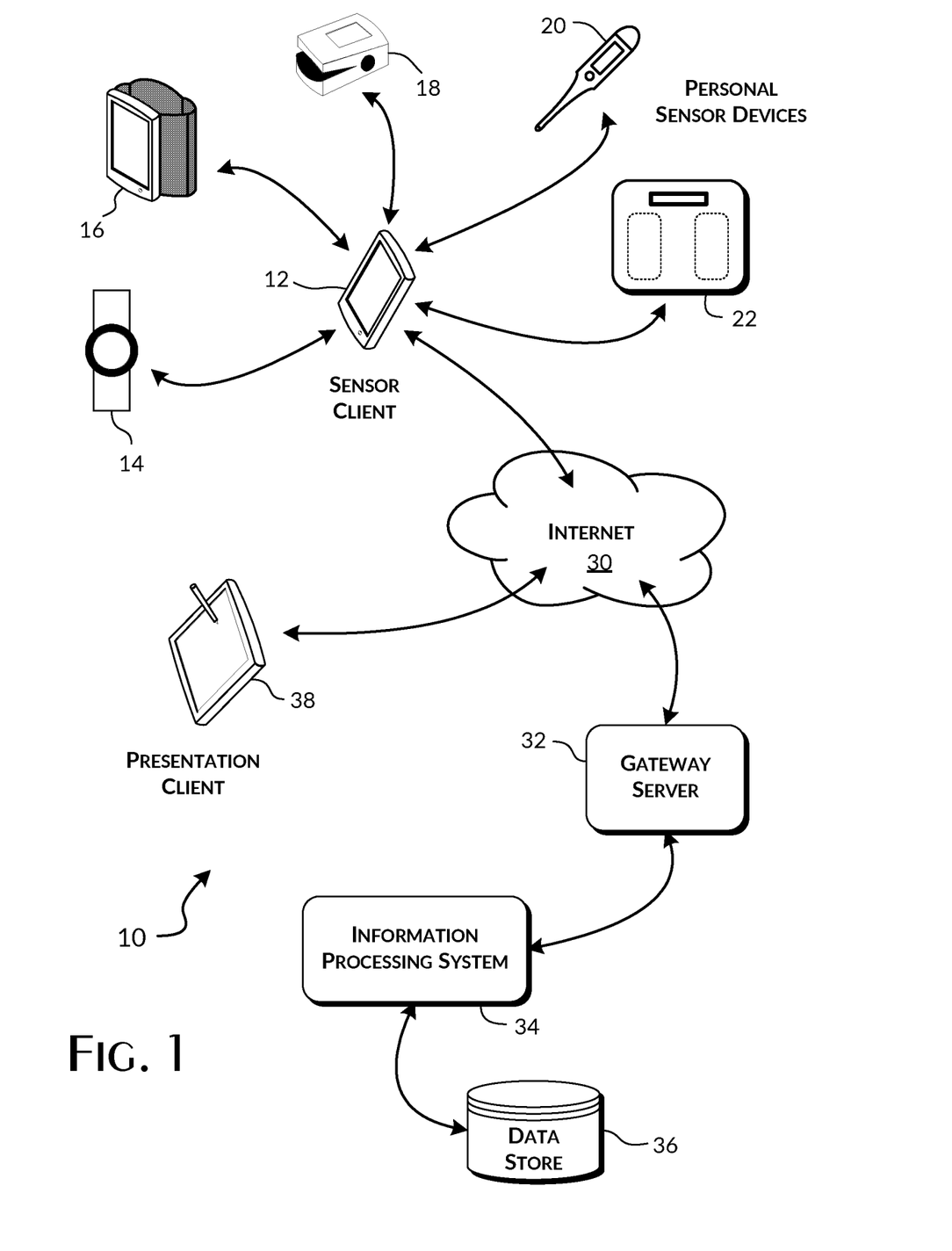
FIG. 1 provides a representative system architecture diagram generally illustrating a preferred embodiment of the present invention.

As generally illustrated in FIG. 1, within the preferred RPM context 10, the present invention contemplates support for any number of remote patients who effectively communicate within the system 10 through a sensor client 12, typically a smart-device such as an IPhone or IPad, preferably capable of supporting multiple wireless communications protocols, including Bluetooth, Wi-Fi, Near-Field (NFC), and others. The sensor client 12 wirelessly connects to and communicates with multiple personal wireless sensor devices, including but not limited to smart-watch 14, upper-arm blood pressure monitor 16, fingertip pulse oximeter 18, smart thermometer 20, and body weight scale 22. These sensor devices may also be connected through wired connections with the sensor client 12. In the context of the preferred embodiments of the present invention, each of the sensor devices can implement one or more monitoring functions that produce sensor measurement data, preferably as streams of measurement samples in Message Queuing Telemetry Transport (MQTT) protocol format, that are transmitted preferably using a Bluetooth protocol connection established with the sensor client 12.

Measurement data is transferred by the sensor client 12 through a network connection that typically routes through the Internet 30 and a public facing gateway server 32 to an information processing system 34. The gateway server 32 preferably provides, as appropriate to the needs of a specific implementation, infrastructure support for various fine-grained access control features, including for example quality-of-service monitoring, load-balancing, and connection filtering. The information processing system 34 processes the received measurement data that is then, in some combination, persisted to a data store 36 and reported to one or more presentation clients 38. Preferably, presentation clients 38 can be smart-phones, tablet computers, or other computer systems capable of establishing a network connection through the gateway server 32 with the information processing system 34 and displaying reported data. The presentation clients 38 are preferably utilized by clinicians, care-givers, patients, and others to review and selectively interact with patient specific reported data, subject to appropriate patient authorizations.

Figure 2:
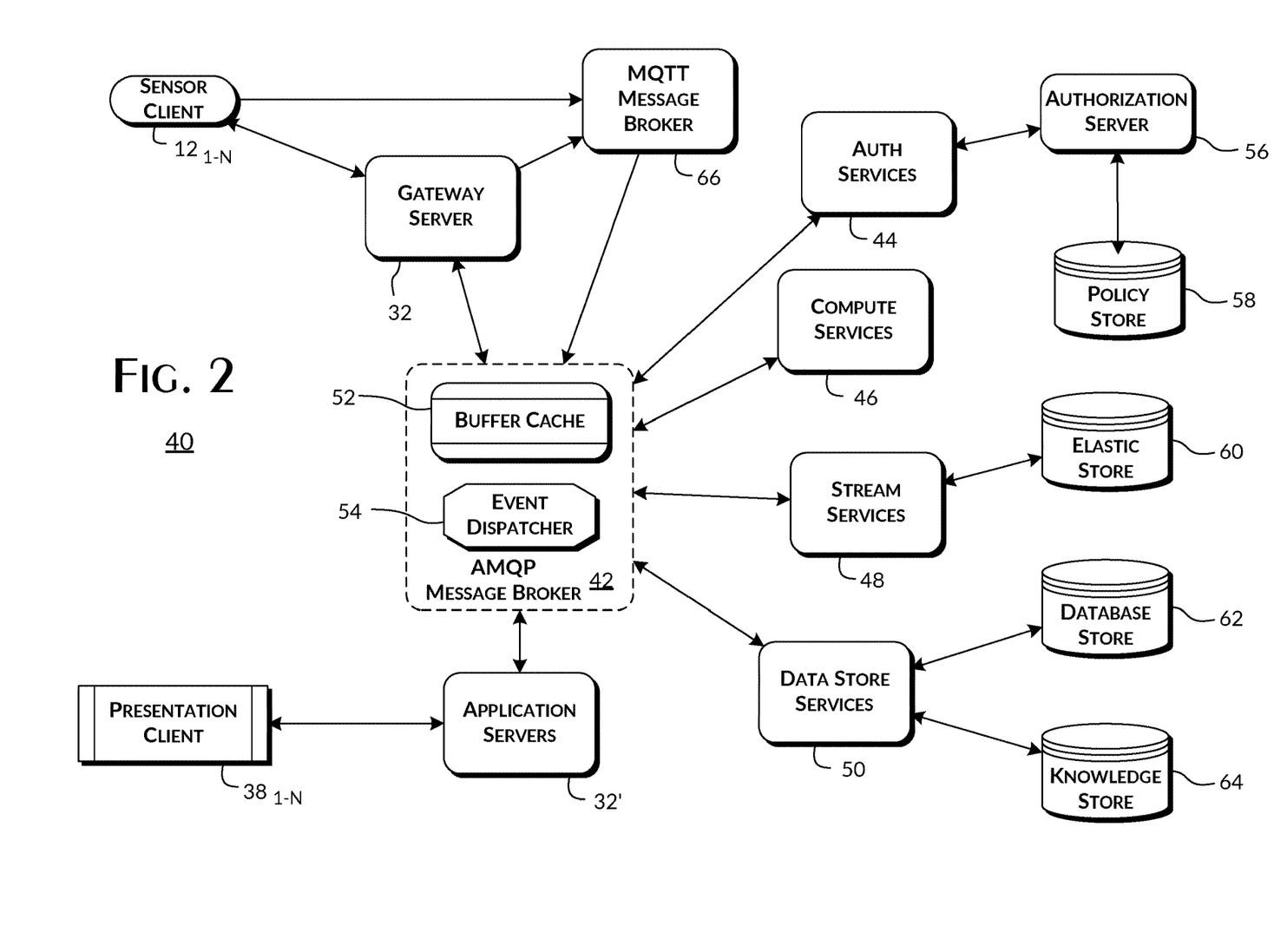
FIG. 2 provides a system architectural block diagram of a preferred system architecture constructed in accordance with a preferred embodiment of the present invention.

The preferred RPM system architecture 40 is shown in FIG. 2. An Advanced Message Queuing Protocol (AMQP) message broker 42 operates as the core component operatively interconnecting a collection of distributed, replicated micro-services, including authorization 44, compute 46, stream data store 48, and indexed data store 50 services. While other functionally similar message broker protocols could be used, AMQP is presently preferred. The AMQP message broker 42 functions as an asynchronous publish/subscribe-based message distributor utilizing an internal buffer cache 52 and reactive event dispatcher 54. The authorization services 44 communicate with a preferably shared authorization server 56 that executes authorization services based on data stored within a policy store 58. The compute services 46 preferably implement computationally intensive data processing operations on sensor measurement data to filter and improve the effective reliability of the collected data. Preferably, both the raw and processed sensor measurement data is streamed by the stream services 48 for persistence in an elastic data store 60. Information characterizing the sensor measurement data, both as provided by the sensor devices and as preferably produced by the compute services 46, are persisted by the indexed data store services 50 in a database store 62. Preferably, the indexed data store services 50 provide access to various knowledge-based reference data sets, collectively represented as persisted in knowledge store 64. These reference data sets may include public data sets hosted on publically accessible servers, third-party data sets hosted on commercial servers, and private data sets hosted on private servers operated by tenant users of the RPM system architecture 40 and available for use in conjunction with services rendered on behalf of tenant-defined subsets of the monitored patients.

Sensor clients $12_{1-N}$ nominally communicate through network connections with a gateway server 32. Messages to request, authorize and manage the connection of Sensor clients $12_{1-N}$ with individual sensor devices are generally processed through the AMQP message broker 42 for handling by the authorization 44, and indexed data store services 50.

MQTT protocol sensor measurement data provided by the sensor clients $12_{1-N}$ is communicated to an MQTT message broker 66 for initial protocol handling and conversion to messages appropriate for distribution through the AMQP message broker 42. The sensor measurement data is preferably routed through network connections directly to the MQTT message broker 66. Alternately, the sensor measurement data may be routed through a gateway server 32 for relay to the MQTT message broker 66. In this alternate embodiment, the gateway server 32 is then available to perform various fine-grained access control functions, including for example quality-of-service monitoring, load-balancing, and connection filtering.

From the MQTT message broker 66, the sensor measurement data is then distributed through the AMQP message broker 42 to the compute services 46 and stream data store services 48. In the presently preferred embodiments of the present invention, the sensor measurement data, as processed by the compute services 46, is routed to the stream data store services 48. Categorization and other data produced by the processing of the sensor measurement data is sent to the indexed data store services 50. In addition, the processed sensor measurement data and certain corresponding characterization data are routed from the compute services 46 to application servers 32'. These application servers 32' are preferably instances of the gateway servers 32 executing a secured, public facing Web-application appropriate to support interactive display of patient sensor information through the presentation clients $38_{1-N}$.

Figure 3:
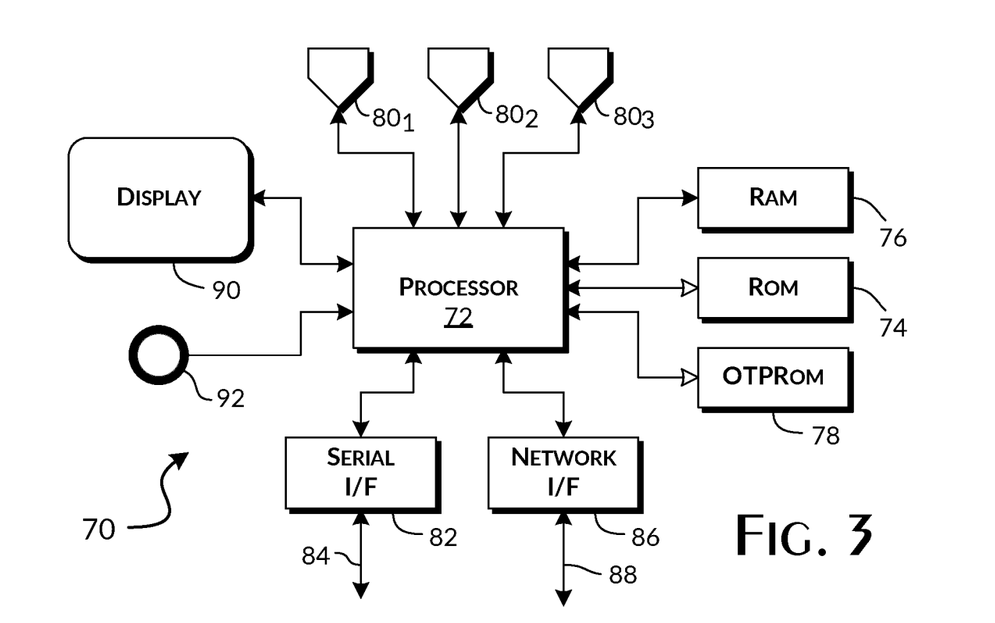
FIG. 3 is an architectural block diagram of a sensor device constructed in accordance with a preferred embodiment of the present invention.

A block diagram for a sensor device 70, constructed generally in accordance with the present invention, is provided in FIG. 3. The sensor device 70 is typically constructed using a system on a chip (SoC) microcontroller system that includes an embedded processor 72, program storage read-only memory (ROM) 74, and program execution support read/write memory (RAM) 76. The read-only memory is preferably used to store a dedicated sensor device management program typically constructed using a small, real-time operating system (RTOS) kernel and a sensor specialized control application. The embedded processor 72 also has access to one-time programmable read-only memory (OTPROM) 78 that allows the sensor device 70 to be factory provisioned with select, unique values, such as a network media access control (MAC) address.

Exemplary sensor elements $80_{1-3}$ are preferably connected as dedicated peripherals to the embedded processor 72. The specific nature, number, and configuration of the sensor elements $80_{1-3}$ will naturally depend on the specific intended function of the sensor device 70.

Integrated communications peripherals preferably include a serial data interface 82, sufficient to support a physical universal serial bus (USB) connection 84, and a network data interface 86, capable of supporting one or more wireless communications protocols 88. At present, Bluetooth Low Energy (BLE) is generally considered to be most commonly used wireless protocol for industrial, scientific, and medical sensor devices and is preferred for use with the present invention.

Human interface peripherals preferably include a touch display 90 and a power on/off button 92. In conventional operation, the touch display presents appropriate infographics sufficient to enable user interaction with the sensor specialized control application to select display modes and operating functions.

Figure 4:
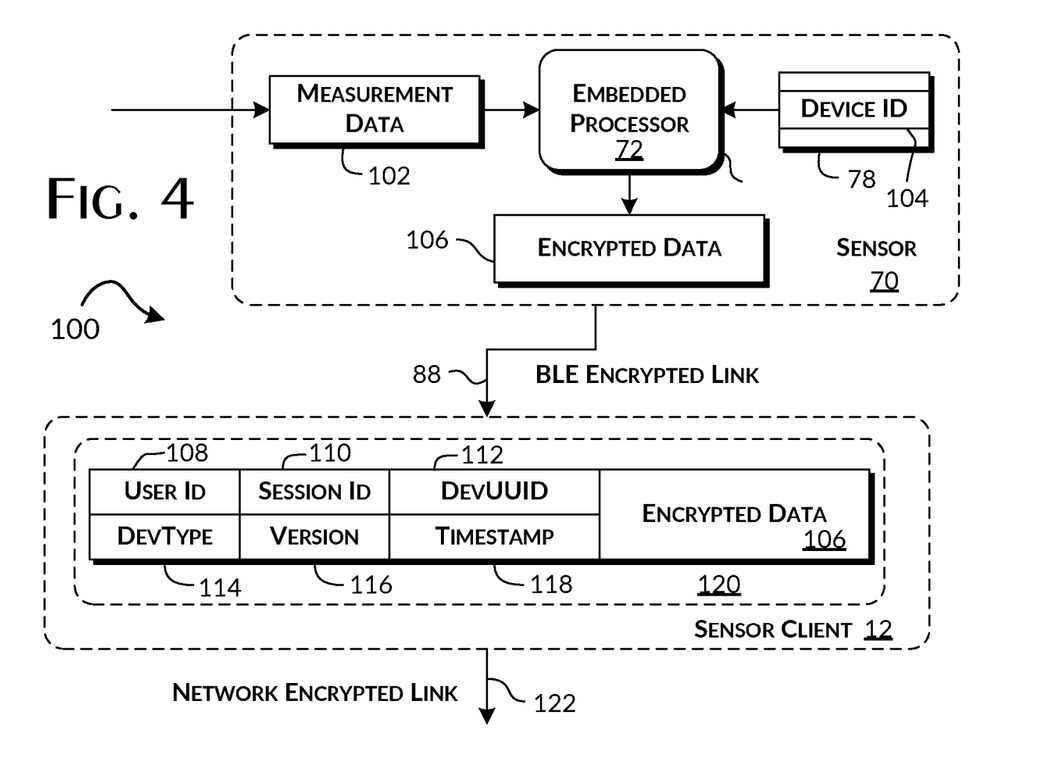
FIG. 4 is a functional block diagram of a sensor device illustrating the processing of sensor measurement data in a preferred embodiment of the present invention.

FIG. 4 provides a functional block diagram 100 showing the preferred processing of sensor measurement data through a sensor device 70 and a sensor client 12. Sensor measure data received from the sensor elements $80_{1-3}$ are collected into measurement data blocks 102 suitable for transfer in MQTT protocol data frames. The measurement data blocks 102 are preferably encrypted using a public key cipher executed by the embedded processor 72 and a public key retrieved from the one-time programmable read-only memory 78. In the presently preferred embodiments of the present invention, this public key is stored as part of a device identifier field 104 present as one of the values stored within one-time programmable read-only memory 78. The resulting encrypted measurement data 106 is then transmitted through a wireless BLE encrypted communications link 88 to a sensor client 12.

In the preferred embodiments of the present invention, the encrypted measurement data 106 is coupled with a number of supporting data fields. These fields preferably include a user identifier 108, session identifier 110, device identifier 112, device type 114, version identifier 116, and timestamp 118 fields. The resulting composite data packet 120 is then transmitted by the sensor client 12 to a gateway server 32 instance through a network encrypted communications link 122.

Figure 5:
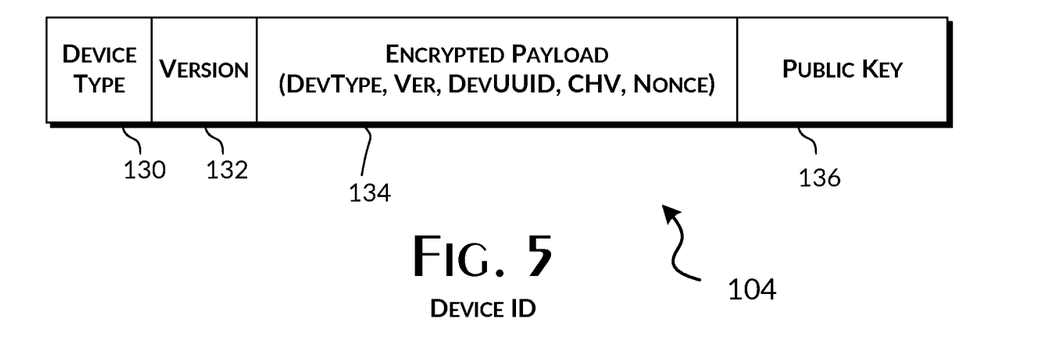
FIG. 5 is a representational block diagram of a device identifier field as implemented in a preferred embodiment of the present invention.

A representative block diagram of a preferred implementation of the device identifier field 104 is shown in FIG. 5. The device identifier field 104 preferably includes clear text device type 130 and device version 132 fields, an encrypted payload field 134, and a clear text public key field 136. The device type field 130 preferably stores a sensor part number with sufficient detail to identify the hardware manufacturer and sensor hardware platform. The version field 132 preferably stores a software version value having sufficient detail to identify the embedded software application.

The encrypted payload field 134 is preferably constructed by encrypting together the device type 130, version 132, a device identifier, cryptographic hash value (CHV), and nonce values. The device identifier is preferably either the MAC address assigned to the network interface 86 or a similarly discretely assigned universally unique identifier (UUID). The choice of the actual device identifier value is preferably made by the system operator of the RPM system architecture 40 and may vary between instances of sensor devices 70. Preferably, the sufficient requirement is that the device identifier be unique to an individual sensor device 70. The CHV value is preferably a conventional cryptographic digest computed using a public/private key pair defined by the system operator of the RPM system architecture 40. Public key encryption of the payload field 134 constituent values is performed using the same public/private key pair. The public key field 136 contains, in clear text, the public key utilized in encrypting the payload field 134.

Figure 6:
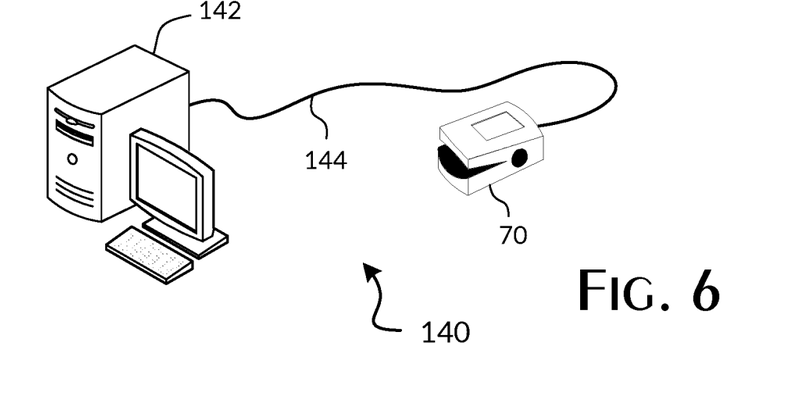
FIG. 6 is a representative system diagram illustrating the provisioning of an individual sensor device in a preferred embodiment of the present invention.

Each sensor device 70 participating in the RPM system architecture 40 is preferably provisioned with electronic marking data, identifying the sensor device 70 as a participating sensor device 70, and an individualized device identifier field 104. As generally shown in FIG. 6, a provisioning system 140 preferably utilizes a dedicated, secure provisioning computer 142, having access to the public/private key pair defined by the system operator of the RPM system architecture 40, to generate a unique device identifier field 104 for each individual sensor device 70. The marking data and device identifier field 104 are preferably transferred the sensor device 70 using a secure physical serial data connection 144. The provisioning computer 142 also uses this connection 144 to command the embedded processor 72 to store the marking data and device identifier field 104 in the one-time programmable memory 78. A sensor device 70, once provisioned with the marking data and unique device identifier field 104, is then a participant sensor device 70 capable of operation in connection with implementations of the RPM system architecture 40.

For purposes of the present invention, the marking data and device identifier field 104 are preferably further stored within the sensor device 70 in a manner that will cause the sensor device 70 to include the marking data and device identifier field 104 in well-defined data packets transmitted openly to advertise the presence of the sensor device 70. These presence data packets are nominally transmitted periodically to enable discoverability by any listening smart-device. In the preferred case of Bluetooth-based wireless communications, a sensor device 70 available to join in a communications connection periodically transmits advertisement data packets containing a copy of a specific generic access profile (GAP) record defined for the advertising sensor device 70. The constituent GAP fields are defined in the Bluetooth Supplement to the Core Specification.

Figure 7:
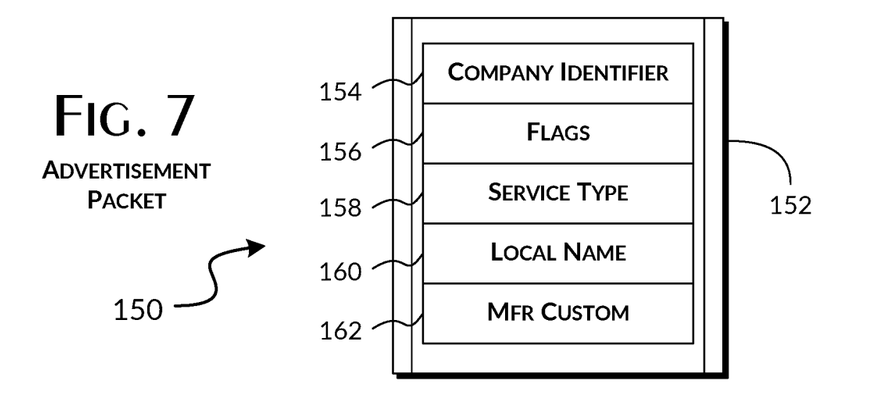
FIG. 7 is a representational block diagram of a wireless device advertisement protocol data packet as implemented in a preferred embodiment of the present invention.

As generally shown in FIG. 7, a Bluetooth discovery protocol data packet 150 includes a generic access profile (GAP) record 152. Of the various GAP fields populated in any particular embodiment, the preferred embodiments of the present invention include a defined company code identifier field 154, flags field 156, service type field 158, local name field 160, and manufacturer custom data field 162.

For a given advertising participant sensor device 70, the company code identifier field 154 preferably contains the well-defined manufacturer identifier registered by the manufacturer of the sensor device 70 with the Bluetooth SIG. The flag field 156 nominally contains a number of bit flags defined in accordance with the Bluetooth specification. Preferably, an additional, custom flag is set to mark the sensor device 70 as being a participant sensor device 70.

The service type field 158 contains one or more well-defined service types. Each service type is represented by a UUID value nominally selected by a sensor device manufacturer from a list of such service types defined by the Bluetooth SIG. Each service type represents a categorical function that may be implemented by conforming devices produced by independent manufacturers. The service types for a given sensor device 70 are thus nominally chosen by the sensor device manufacturer to define the Bluetooth recognizable function or functions implemented by an individualized sensor device 70. In accordance with the preferred embodiments of the present invention, an additional, custom service type is added to the service type field 158 to further mark a sensor device 70 as being a participant sensor device 70. This additional service type is preferably a identifier of the RPM system architecture 40.

The local name field 160 is optionally used to provide a local, display oriented name nominally provided by the manufacturer for the sensor device 70 being advertised. In alternate preferred embodiments of the present invention, the nominally provided name may be modified to incorporate a general or specific reference to some particular implementation of the RPM system architecture 40. This reference may be used in place of or in addition to the added service type mark a sensor device 70 as being a participant sensor device 70.

The manufacturer custom data field 162 is nominally made available to provide diagnostic information only significant internally to the manufacturer of the specific sensor device 70. For purposes of the present invention, the entire manufacturer custom data field 160 is used in the preferred embodiments to instead publish the contents of the device identifier field 104. Specifically, in the preferred Bluetooth use case, the provisioning computer 142 directs the device identifier field 104 to be stored in the one-time programmable memory 78 at the locations nominally reserved for storing the entirety of the sensor device manufacturer custom data 162.

Figure 8:
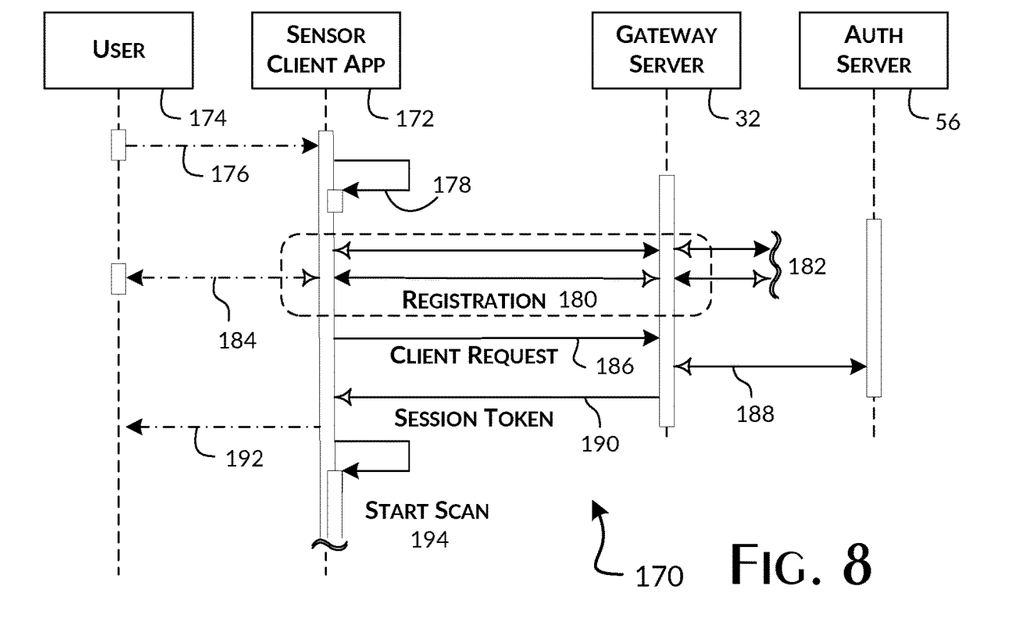
FIG. 8 provides a sequence diagram illustrating a preferred sensor client application initialization process as implemented in a preferred embodiment of the present invention.

FIG. 8 illustrates a preferred sensor client application initialization process 170 as implemented in preferred embodiments of the present invention. The sensor client application 172, as executed by the sensor client 12, preferably conforms to the nominal requirements for third-party applications executable by conventional smart-devices, including smart-phones and tablets. When a user 174 activates the sensor client application 172, such as by launching 176 the application, the application initializes 178. This initialization operation 178 preferably includes checking for local registration credentials with a designated implementation of the RPM system architecture 40. Preferably, the designated implementation of the RPM system architecture 40 is identified by a uniform resource identifier (URI) either stored by the sensor client application 172 or provided by the user 174. Where the local registration credentials are absent, incomplete, or expired, a registration process 180 is initiated with the designated implementation of the RPM system architecture 40. The registration process 180 includes an information exchange 182 with designated implementation of the RPM system architecture 40 and, as necessary, the solicitation 184 of additional information from the user 174. The registration process 180 establishes sufficient information to identify and, as appropriate, establish an account with the designated implementation of the RPM system architecture 40 on behalf of the user 174. The sensor client application 172 preferably stores the resultant local registration credentials.

The local registration credentials are then preferably sent in a client session request 186 to the gateway server 32 for evaluation 188 by the authorization server 56. On successful authorization, a session token 190, including the user identifier 108 and session identifier 110, is returned to the sensor client application 172. The user identifier 108 is preferably a durable identifier of the user 174 persisted in the account established on behalf of the user 174 with the designated implementation of the RPM system architecture 40. The session identifier 110 is preferably a generated value with a session-scoped lifetime determined by the secure communications policies established by the designated implementation of the RPM system architecture 40. Failure to authorize and, optionally, confirmation of the authorization, is presented 192 to the user 174. The sensor client application 172 then preferably begins scanning 194 for participating sensor devices 70.

Figure 9:
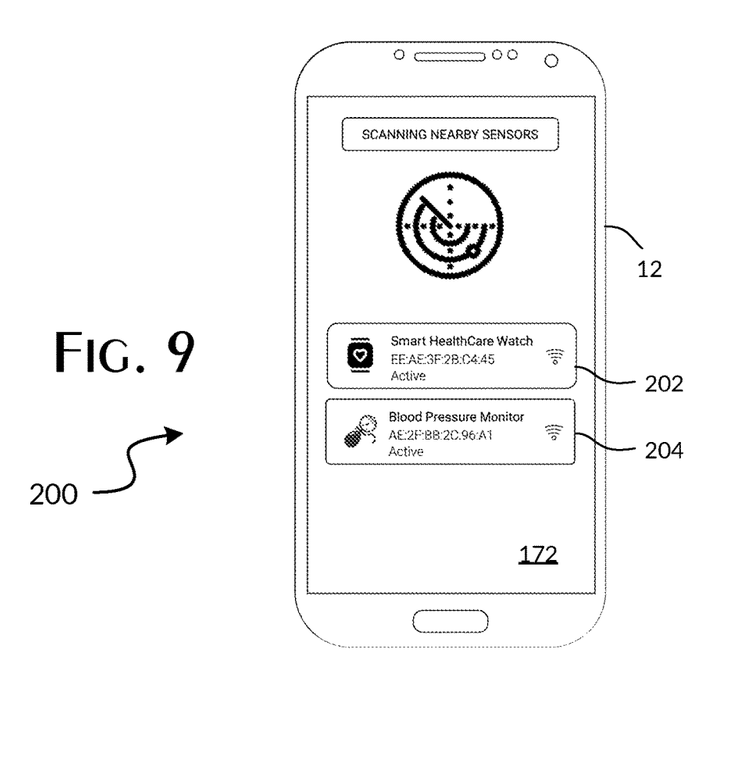
FIG. 9 provides a representative illustration of a smart-device executing a preferred sensor client application as implemented in a preferred embodiment of the present invention.

A representative illustration 200 of a sensor client 12 executing the sensor client application 172 is shown in FIG. 9. In accordance with preferred embodiments of the present invention, once the sensor client application 172 has initialized and successfully authorized, the scan 194 autonomously recognizes participating sensor devices 70 and initiates communications on behalf of the designated implementation of the RPM system architecture 40. The present invention thus requires no further interaction on the part of a user 174, beyond the user 174 pressing the power-on button 92 on the individual sensor devices 70 in the possession of the user 174, for the sensor client application 172 to automatically establish a secure communications connection with those participating sensor devices 70 and begin transferring encrypted sensor measurement data to the designated implementation of the RPM system architecture 40. Preferably, visual notifications 202, 204 are presented to the user 174 by the sensor client application 172 for each participating sensor devices 70 recognized.

Figure 10:
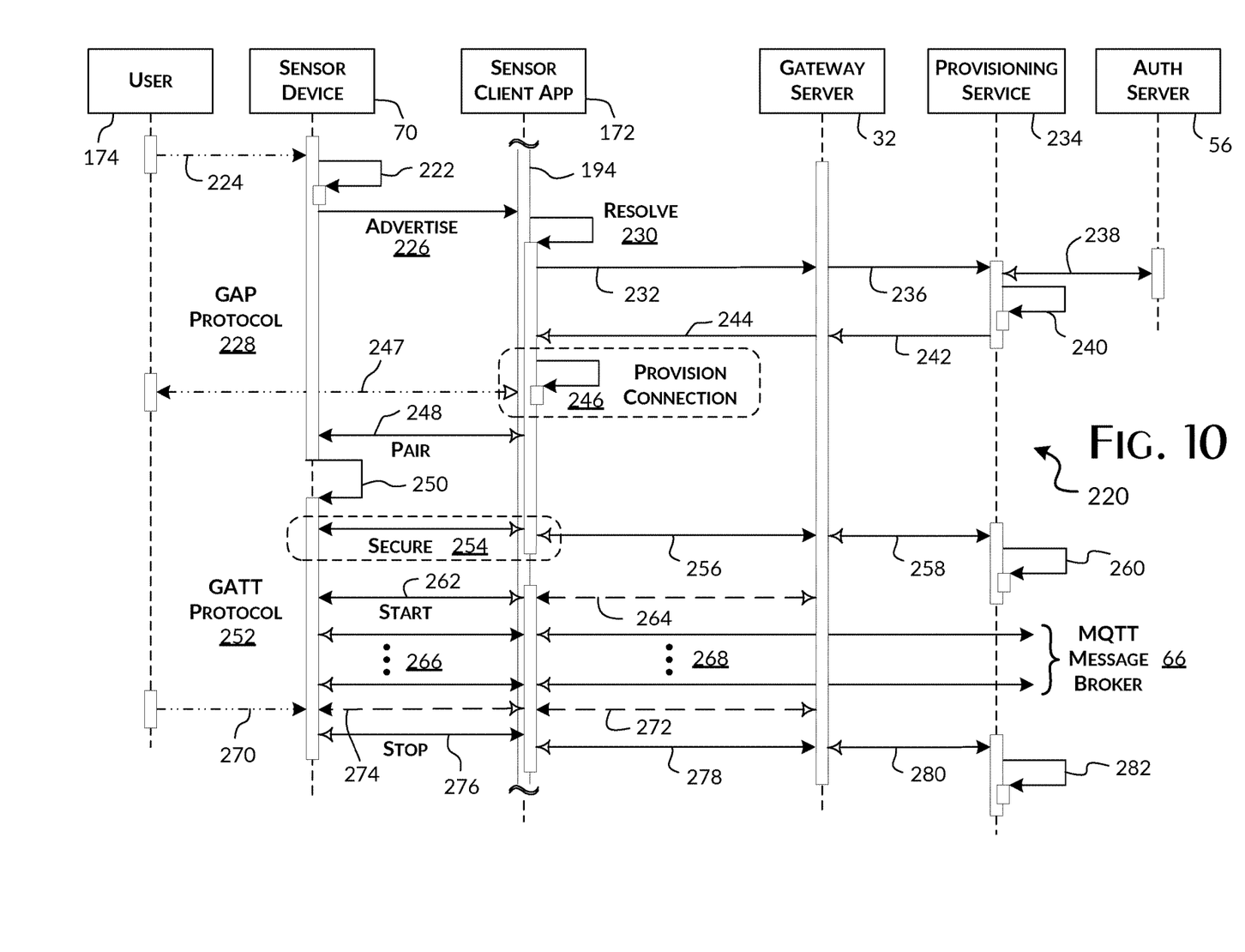
FIG. 10 provides a sequence diagram illustrating the autonomous sensor communication process as implemented in accordance with a preferred embodiment of the present invention.

FIG. 10 provides a sequence diagram detailing the autonomous sensor communication process 220 as implemented in preferred embodiments of the present invention. A participating sensor device 70, pre-configured to store a device identifier 104, self-initializes 222 in response to the user 174 pressing 224 the power-on button 92. The participating sensor device 70 then begins transmitting 226 advertisement data packets including a GAP record 152 containing the device identifier 104 consistent with the GAP protocol process 228.

The sensor client application 172, within the process of scanning 194, receives advertisement data packets and resolves 230 the GAP records 152 contained therein. As part of the GAP record resolution 230, each GAP record 152 is checked for sufficient marking data to indicate origination from a participant sensor device 70. In the preferred embodiments of the present invention, sufficient marking data is determined from some combination of the flags field 156 data, a service type field 158 UUID value, and a local name qualifier. In a particular preferred embodiment the marking data is defined by a single custom bit in the flag field 156 and by the service type field 158 including the service type UUID value assigned to denote implementations of the RPM system architecture 40.

Where a GAP record 152 is resolved as originating from a participant sensor device 70, the contents of the manufacturer custom data field 162, containing the device identifier 104, is sent 232 by the sensor client application 172 to a designated implementation of the RPM system architecture 40 as determined directly or indirectly from the session token 190. As generally shown, the device identifier 104 is sent to the gateway server 32 and subsequently distributed 236 as a message to a provisioning service 234. In the presently preferred embodiments of the present invention, the provisioning service 234 is preferably implemented as part of the authorization services 44. The provisioning service 234 communicates with the authorization server 56 to authenticate the participant sensor device 70 represented by the device identifier 104. In the preferred embodiments of the present invention, the private key of the designated implementation of the RPM system architecture 40 is used in combination with the public key 136 to decrypt the encrypted payload 134. Agreement between the device type and version values obtained are compared to the clear text values present in the device type and version fields 130, 132 is preferably considered sufficient to authenticate the participant sensor device 70.

The device UUID value obtained from the decryption of the encrypted payload 134 represents a secure, unique identifier of the participant sensor device 70. This device UUID value is preferably utilized to retrieve 240 provisioning information specific to the participant sensor device 70. The provisioning information is preferably retrieved by the provisioning service 234 by an exchange of messages with the data store services 50. Preferably included in the retrieved provisioning information is the current wireless connection password for the participant sensor device 70, at least to the extent known to the designated implementation of the RPM system architecture 40, and whether the current password is the default password for the participant sensor device 70. A message containing the provisioning information, including the device UUID value, is returned 242 to the gateway server 32 and then communicated 244 to the sensor client application 172.

Where the provisioning information represents a new connection target for the sensor client 12, the sensor client application 172 will direct the provisioning 246 of a new connection descriptor by the sensor client 12. If the provisioning information refers to a connection target previously known to the sensor client 12, the corresponding connection descriptor is activated. Where the connection target is unknown to the sensor client 12, the connection provisioning 246 will involve the sensor client to create a suitable persistent provisioning descriptor. Dependent on the requirements of any native security manager resident in the sensor client 12, user confirmation 247 to initially create the connection descriptor may be required or conditionally obtained. A corresponding visual notification 202, 204 may then be presented by the sensor client 12 to the user 174. The sensor client application 172 then attempts to pair 248 with the participant sensor device 70 utilizing the current connection password provided in the provisioning information. Upon successful pairing, the participant sensor device 70 will automatically transition 250 from the GAP protocol 228 to the generic attribute profile (GATT) protocol 252.

In accordance with the preferred embodiments of the present invention, where a default password was used in pairing 248 with the participant sensor device 70, the sensor client application 172 acts to secure 254 the operative relationship between the participant sensor device 70 and the designated implementation of the RPM system architecture 40. Preferably, the sensor client application 172 generates a new, random valued password. The participant sensor device 70 is then commanded to internally store and require this new password in any future pairing 248 request.

The sensor client application 172 then preferably sends 256 updated provisioning information to the gateway server 32 for transfer by message 258 to the provisioning service 234. This updated provisioning information preferably includes time, status and, optionally, location data specific to the now connected participant sensor device 70. Any new, now current password that was committed 254 to the participant sensor device 70 is also included in the updated provisioning information. Preferably, neither the sensor client 12 nor sensor client application 172 retain a persistent copy of the current password. The provisioning service 234 preferably directs 260 storage of the provisioning information via a data store service 50 in association with the device UUID value given for the specific participant sensor device 70. The participant sensor device 70 is thus operatively locked to the designated implementation of the RPM system architecture 40 as the sole, secure, authoritative source of the current password required for pairing 248 with the participant sensor device 70.

The sensor client application 172 can then issue a start command 262 to the participant sensor device 70. In the preferred embodiments of the present invention, the provisioning information determines whether the start command 262 will be either auto-generated by the sensor client application 172 or deferred until a message 264, typically as originated from a compute service 46, is received via the gateway server 32.

The start command 262 initiates the transfer 266 of encrypted sensor measurement data 106 to the sensor client application 172. The encrypted sensor measurement data 106 is associated with attribute fields 108 110, 112, 114, 116, 118 whose values are derived from the session token 190 and provisioning information to produce composite data packets 120 that are transferred 268 by the sensor client application 172 to the MQTT message broker 66.

The transfer 266 of encrypted sensor measurement data 106 may be terminated by action by the user 174 by, for example, pressing the button 92 to power-off the participant sensor device 70. Alternately, the participant sensor device 70 may self-terminate the transfer 266 after completion of some defined number of measurement data transfers, passage of a defined measurement time window for collecting measurement data, or upon elapse of a defined inactivity time period triggered from a failure to acquire valid sensor measurement data. Termination of the transfer 266 may also be triggered by receipt of a message 272 from the gateway server 32, again typically as originated from a compute service 46 and forwarded 274 to the participant sensor device 70.

A stop action message is preferably transmitted 276 by the participant sensor device 70 to the sensor client application 172. Preferably, additional provisioning information corresponding to the specific participant sensor device 70 is then sent 278 through the gateway server 32 and transferred as a message 280 to the provisioning service 234. This additional provisioning information preferably contains information describing the active measurement period including, for example, the time and given cause of termination and, optionally, the location of the participant sensor device 70 at termination. The provisioning service 234 preferably directs 282 storage of the additional provisioning information via a data store service 50 in association with the device UUID value given for the specific participant sensor device 70.

Preferably, the sensor measurement data transfer cycle, as generally represented by the start command 262, data transfer 266, and stop operation 274, can be repeated provided power to the sensor device 70 is not terminated.

Figure 11:
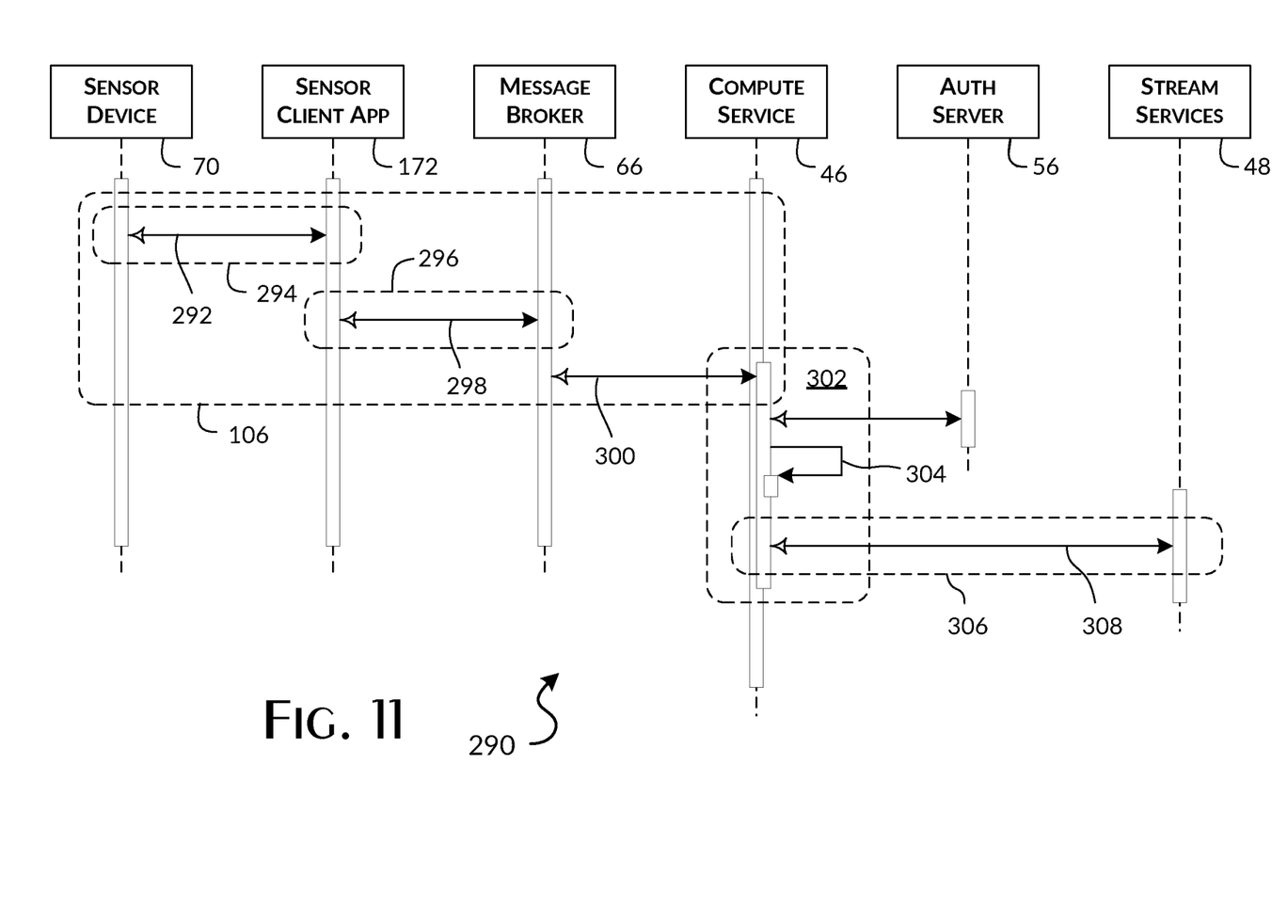
FIG. 11 illustrates the overlapping encryption protection scopes for sensor measurement related data flows through a preferred embodiment of the present invention.

The scope of encryption protection 290 for sensor measurement data as provided by the preferred embodiments of the present invention is generally shown in FIG. 11. As previously described, participant sensor devices 70 apply public key encryption to the locally acquired sensor measurement data 102 to produce encrypted sensor measurement data 106 prior to wireless transmission 292. Link layer encryption 294 is preferably applied to the wireless data packets while in flight to the sensor client 70, but stripped as the packets are routed within the sensor client 12 and through the sensor client application 172. Even as so routed, the encrypted sensor measurement data 106 remains fully secure. Link layer encryption is again preferably applied 296 to network transmitted 298 composite data packets 120 while in transit between the sensor client 12 and gateway server 32.

In the preferred embodiments of the present invention, encrypted sensor measurement data 106 may and typically is then be transferred 300 multiple times through the many different constituent components of a particular designated implementation of the RPM system architecture 40. As previously described, the RPM system architecture 40 is preferably both redundantly implemented and geographically distributed. In accordance with the present invention, the encrypted sensor measurement data 106 preferably remains encrypted until reaching a compute service instance 46 internally selected to process the underlying sensor measurement data 102. In the preferred embodiments of the present invention, this compute service instance 46 executes within a secure container 302, such as preferably provided by Kubernetes. The secure container 302 interoperates with the authorization server 56 to enable decryption of the encrypted sensor measurement data 106 for use by the compute service instance 46 without exposing the sensor measurement data 102 outside of the secure container 302. The sensor measurement data 102 can thus be processed 304 by the compute service instance 46 without loss of security protections.

In preferred embodiments of the present invention, the sensor measurement data 102 is processed by the compute service instance 46 to variously provide improved views of the sensor measurement data 102. Both the as received and as revised sensor measurement data 102 are transferred through the stream services 48 for at least temporary storage. In accordance with the preferred embodiments of the present invention, the as received and as revised sensor measurement data 102 are re-encrypted 306 by the compute service instance 46 prior to sending to the stream services 48. Thus, even though the as received and as revised sensor measurement data 102 may only be transiently stored in the elastic store 60, the transfer and storage of the as received and as revised sensor measurement data 102 is performed in preferred embodiments of the present invention also without loss of security protections.

Thus, an efficient and secure, autonomously operable system of communications between a distributed set of individually identifiable sensor devices and a remote sensor management system has been described.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method executed on a client device for autonomously establishing secure communications between a sensor device and a remote server system and mediated by the client device, the method comprising:
   a) receiving a sensor device identifier unique to the sensor device, the sensor device identifier including one or more data fields autonomously advertised by the sensor device;
   b) retrieving provisioning information defined for the sensor device identifier from the remote server system, the provisioning information including a sensor device password;
   c) establishing a secure communications session with the sensor device utilizing the provisioning information, at least in part by providing the sensor device password to the sensor device;
   d) transmitting instructions to the sensor device to require an alternate sensor device password to enable the secure communications session;
   e) transmitting to the remote server system the alternate sensor device password for inclusion in subsequently retrieved provisioning information; and
   f) receiving measurement data from the sensor device and transmitting that received measurement data to the remote server.

2. The method of claim 1 further comprising generating the alternate sensor device password.

3. The method of claim 1 further comprising transmitting to the sensor device instructions to begin collection or transmission of the measurement data.

4. The method of claim 3 wherein the instructions to begin collection or transmission of measurement data are transmitted in response to a signal received from the remote server system.

5. The method of claim 1 further comprising:
   b') retrieving the provisioning information defined for the sensor device identifier from the remote server system, the provisioning information including the alternate sensor device password;
   c') establishing an additional secure communications session with the sensor device utilizing the provisioning information, at least in part by providing the alternate sensor device password to the sensor device; and
   f') receiving additional measurement data from the sensor device and transmitting that received additional measurement data to the remote server.

6. The method of claim 1 further comprising:
   a') receiving a second sensor device identifier unique to a second sensor device, the second sensor device identifier including one or more data fields autonomously advertised by the second sensor device;
   b') retrieving second provisioning information defined for the second sensor device identifier from the remote server system, the second provisioning information including a second sensor device password;
   c') establishing a secure communications session with the second sensor device utilizing the second provisioning information, at least in part by providing the second sensor device password to the second sensor device;
   d') transmitting instructions to the second sensor device to require an alternate second sensor device password to enable the secure communications session;
   e') transmitting to the remote server system the alternate second sensor device password for inclusion in subsequently retrieved second provisioning information; and
   f') receiving second measurement data from the second sensor device and transmitting that received second measurement data to the remote server.

7. The method of claim 6 further comprising:
   b") retrieving the second provisioning information defined for the second sensor device identifier from the remote server system, the second provisioning information including the alternate second sensor device password;
   c") establishing an additional secure communications session with the second sensor device utilizing the second provisioning information, at least in part by providing the alternate second sensor device password to the second sensor device; and
   f") receiving additional second measurement data from the second sensor device and transmitting that received additional second measurement data to the remote server.

8. The method of claim 1, the measurement data received from the sensor device and transmitted to the remote server being in encrypted form according to a public encryption key of a corresponding asymmetric key pair, the public encryption key being stored in the sensor device and a corresponding private encryption key of the asymmetric key pair being stored in the remote server.

9. The method of claim 1 further comprising encrypting the measurement data according to a public encryption key of a corresponding asymmetric key pair, the public encryption key being stored in the client device and a corresponding private encryption key of the asymmetric key pair being stored in the remote server, the measurement data being transmitted to the remote server in encrypted form according to the public encryption key.

10. A client device comprising a one or more hardware processors, one or more non-transitory digital storage media, and one or more wired or wireless network connections, the client device being structured, programmed, and connected to perform a method for autonomously establishing secure communications between a sensor device and a remote server system and mediated by the client device, wherein the method comprises:
   a) receiving a sensor device identifier unique to the sensor device, the sensor device identifier including one or more data fields autonomously advertised by the sensor device;
   b) retrieving provisioning information defined for the sensor device identifier from the remote server system, the provisioning information including a sensor device password;
   c) establishing a secure communications session with the sensor device utilizing the provisioning information, at least in part by providing the sensor device password to the sensor device;
   d) transmitting instructions to the sensor device to require an alternate sensor device password to enable the secure communications session;
   e) transmitting to the remote server system the alternate sensor device password for inclusion in subsequently retrieved provisioning information; and
   f) receiving measurement data from the sensor device and transmitting that received measurement data to the remote server.

11. The client device of claim 10 wherein the method further comprises generating the alternate sensor device password.

12. The client device of claim 10 wherein the method further comprises transmitting to the sensor device instructions to begin collection or transmission of the measurement data.

13. The client device of claim 12 wherein the instructions to begin collection or transmission of measurement data are transmitted in response to a signal received from the remote server system.

14. The client device of claim 10 wherein the method further comprises:
- b') retrieving the provisioning information defined for the sensor device identifier from the remote server system, the provisioning information including the alternate sensor device password;
- c') establishing an additional secure communications session with the sensor device utilizing the provisioning information, at least in part by providing the alternate sensor device password to the sensor device; and
- f') receiving additional measurement data from the sensor device and transmitting that received additional measurement data to the remote server.

15. The client device of claim 10 wherein the method further comprises:
- a') receiving a second sensor device identifier unique to a second sensor device, the second sensor device identifier including one or more data fields autonomously advertised by the second sensor device;
- b') retrieving second provisioning information defined for the second sensor device identifier from the remote server system, the second provisioning information including a second sensor device password;
- c') establishing a secure communications session with the second sensor device utilizing the second provisioning information, at least in part by providing the second sensor device password to the second sensor device;
- d') transmitting instructions to the second sensor device to require an alternate second sensor device password to enable the secure communications session;
- e') transmitting to the remote server system the alternate second sensor device password for inclusion in subsequently retrieved second provisioning information; and
- f') receiving second measurement data from the second sensor device and transmitting that received second measurement data to the remote server.

16. The client device of claim 15 wherein the method further comprises:
- b") retrieving the second provisioning information defined for the second sensor device identifier from the remote server system, the second provisioning information including the alternate second sensor device password;
- c") establishing an additional secure communications session with the second sensor device utilizing the second provisioning information, at least in part by providing the alternate second sensor device password to the second sensor device; and
- f") receiving additional second measurement data from the second sensor device and transmitting that received additional second measurement data to the remote server.

17. The client device of claim 10, the measurement data received from the sensor device and transmitted to the remote server being in encrypted form according to a public encryption key of a corresponding asymmetric key pair, the public encryption key being stored in the sensor device and a corresponding private encryption key of the asymmetric key pair being stored in the remote server.

18. The client device of claim 10 wherein the method further comprises encrypting the measurement data according to a public encryption key of a corresponding asymmetric key pair, the public encryption key being stored in the client device and a corresponding private encryption key of the asymmetric key pair being stored in the remote server, the measurement data being transmitted to the remote server in encrypted form according to the public encryption key.

19. The client device of claim 10 wherein the client device comprises a smart device, a smartphone, or a tablet computer.

* * * * *